AUTOMATIC DIALING DEVICE

Filed June 25, 1954

3 Sheets-Sheet 1

INVENTORS.
MARCEL DEMEULENAERE.
ROBERT DEMEULENAERE.
BY Ward, Neal, Haselton, Orme & McElhannon
ATTORNEYS Sept. 18, 1956 M. A. DEMEULENAERE ET AL 2,763,728

AUTOMATIC DIALING DEVICE

Filed June 25, 1954 3 Sheets-Sheet 2

INVENTORS.
MARCEL DEMEULENAERE.
ROBERT DEMEULENAERE.
BY Ward, Neal, Haselton,
Orme & McElhannon
ATTORNEYS.

AUTOMATIC DIALING DEVICE

Filed June 25, 1954 3 Sheets-Sheet 3

INVENTORS.
MARCEL DEMEULENAERE.
ROBERT DEMEULENAERE.
BY Ward, Neal, Haselton, Orme & McElhannon
ATTORNEYS.

United States Patent Office 2,763,728

Patented Sept. 18, 1956

2,763,728

AUTOMATIC DIALING DEVICE

Marcel Antoine Demeulenaere and Robert Demeulenaere, New York, N. Y.

Application June 25, 1954, Serial No. 439,186

6 Claims. (Cl. 179—90)

This invention relates to a device for actuating the dial of a telephone instrument forming part of a dial telephone system and particularly to a device which, upon one actuation of a single key, will rotate the dial of a telephone instrument in the manner necessary to place a call to a desired party.

Telephone instruments for use with automatic telephone switching equipment are well known and such instruments, in addition to a hand set, have a manually operable dial which, after the hand set has been removed and dial tone has been received, is manually actuated a plurality of times in succession to place a call to a desired party. Manual operation of such a dial is not only time-consuming but also tedious if it must be performed frequently.

It frequently occurs that the user of a dial telephone instrument places many calls to one or more of several parties. In this situation, it is possible to provide a device which upon one operation of a single key, knob, etc., actuates the dial of the instrument in the manner necessary to place the call to the desired party. Such a device usually employs an electrically driven motor and a control mechanism which is set into operation by the aforementioned key, knob, etc.

Although dialing devices of the type described above are known in the art, many of such devices are complex, relatively large in size, and expensive to make. In addition, it is relatively difficult to set up the control mechanism so that actuation of the key, knob, etc., will cause the proper actuation of the dial of the telephone instrument. In some cases special tools are required and in most cases the set up procedure is such that it is difficult for an unskilled operator to set the control mechanism properly. This problem is particularly serious when it is desired to change from time to time the set up of the control mechanism so that parties different from those for which the device was originally set may be called.

The dialing device of the present invention is of the general type described above. However, the dialing device of the present invention is an improvement over the dialing devices previously known and is not only relatively simple in structure and operation, but also is simple and inexpensive to manufacture. In addition, the control mechanism may be easily set up or changed by an unskilled operator, the mechanism being set by merely moving a single arm or lever, by depressing the key which it is desired to employ subsequently to call a particular party and by manually operating an auxiliary dial in the manner usually employed to manually dial such party. After the initial operation of the auxiliary dial for the purpose of setting up the control mechanism and after returning said arm or lever to its normal position, the party may be called one or more times by merely pressing a single key.

The invention may be better understood by referring to the following detailed description setting forth the manner in which we now prefer to practice the invention and to the accompanying drawings, in which.

*General description*

Figures 1, 5, 6, 7, 9, 10, 11, 12:
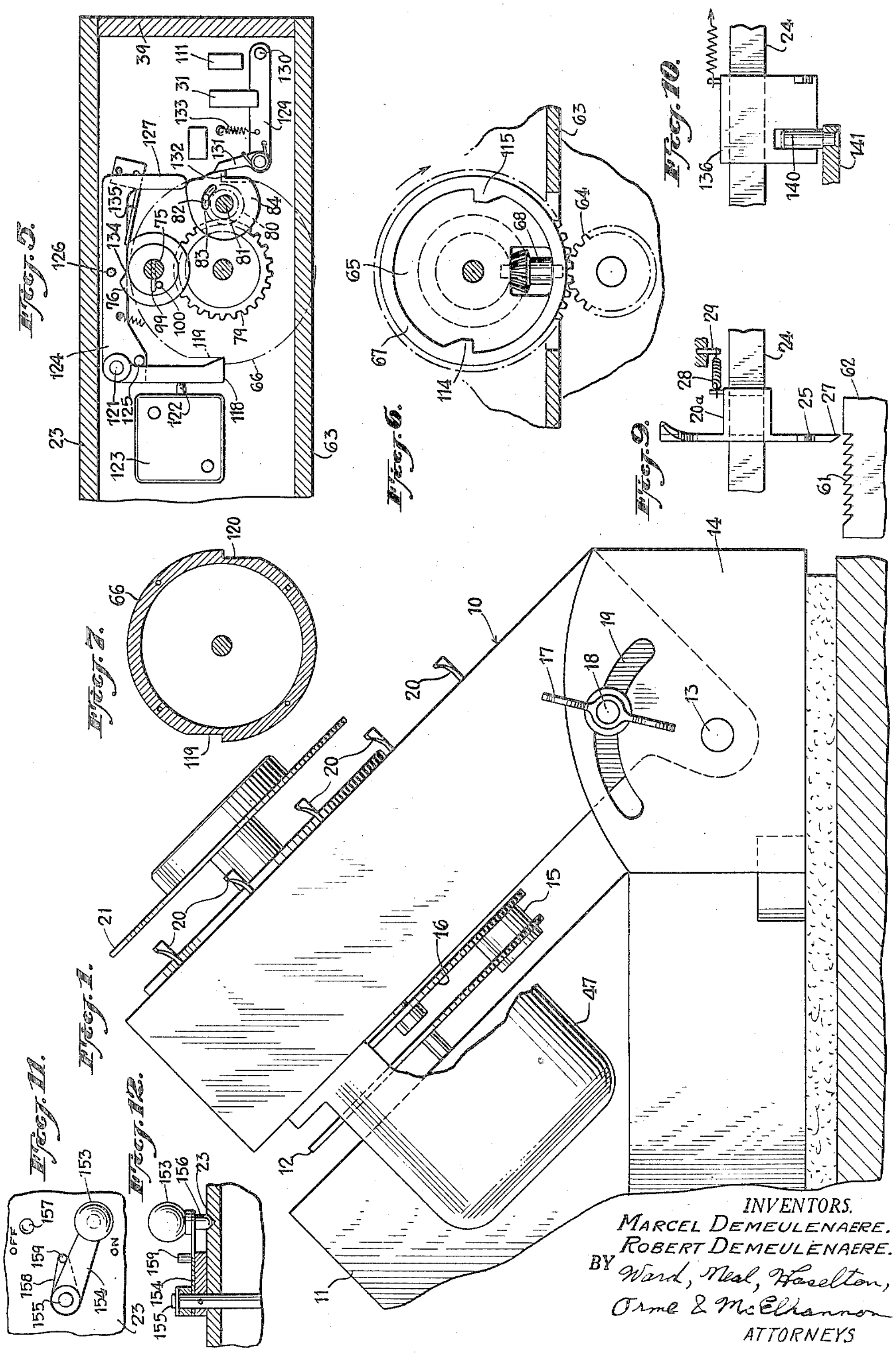
Fig. 1 is a fragmentary, side elevation view of an automatic dialing device of the invention with a portion thereof broken away to show parts of the device more clearly.
Fig. 5 is a fragmentary, cross-sectional view of a portion of the apparatus shown in the preceding figures and is taken along the line 5—5 indicated in Fig. 2.
Fig. 6 is an elevation view of a differential gear and cam forming part of the dialing device of the invention.
Fig. 7 is a cross-sectional view of the gear and cam shown in Fig. 6.
Fig. 9 is a side elevation view of the call-initiating key and its associated ratchet.
Fig. 10 is a side elevation view of a portion of the call number setting mechanism and its associated ratchet.
Fig. 11 is a fragmentary, plan view of a portion of the device 10 showing the lever employed when it is desired to set a key mechanism.
Fig. 12 is a cross-sectional view of the parts shown in Fig. 11.

Referring to Fig. 1, the dialing device indicated generally by the numeral 10 is placed adjacent the base 11 of a conventional telephone instrument having a finger-operable dial 12. The dialing device 10 is pivotally mounted on a shaft 13 which is supported by a stand 14 and is held in a position such that the finger 15 on the arm 16 extends through the tenth or last hole in the dial 12. The device 10 is held in the desired position by means of a wing nut 17 threaded on a stud or bolt 18 which passes through an arcuate slot 19 in the stand 14.

The dialing device 10 is provided with a plurality of keys 20 (for example, in the present embodiment eighteen keys are provided) which are identical in construction and operation. By means hereinafter described, the mechanisms associated with each key 20 may be set so that when a key is moved downwardly the calling of a party is initiated and finger 15 causes the dial 12 to perform the operations which would be performed if the calling of the party were performed manually with the use of the dial 12 alone. Thus, the mechanisms associated with the keys 20 may be set up so that each one of the keys 20 may be employed to call a different party or number and, therefore, in the embodiment shown, the device may be set up so that any one of eighteen parties or numbers may be called by mere movement of one of the keys 20, assuming, of course, that the telephone hand set has first been removed from its hook on the base 11.

The device 10 is also provided with a manually operable dial 21 which is similar in form and construction to the dial 12. The dial 21 is employed when it is desired to call a party or number manually without removing the device 10 from its position shown in Fig. 1 and it is also employed when setting up the mechanism which is set into operation by movement of one of the keys 20. Thus, any one of the mechanisms associated with the keys 20 may be set up, as hereinafter described in greater detail, by operating a number-setting lever to its "off" position and by subsequently operating the dial 21 manually in the same manner that one would operate the dial 12 to call such party or number. After the mechanism associated with the desired key has been set in this manner, the number-setting lever is returned to its "on" position and by pressing or moving the key which was selected to call a particular party or number the dial 12 will be driven by a motor 47 through the device 10 so as to dial the desired party or number.

*Keys and their operation*

Referring to Figs. 2–4, 8 and 9, the keys 20 extend through apertures 22 in the top cover 23 of the housing of the device 10. The keys 20 are mounted on rectangular key bars 24 which extend through rectangular apertures in the bodies of the keys and through rectangular apertures in rams 20a secured to or integral with the main bodies of the keys 20. Each key is slidable lengthwise of the bar 24 on which it is mounted, but when a bar 24 is rotated as hereinafter described the keys mounted on such bar 24 are tilted. Each key is provided with a tab or toe 25, a heel portion 26 and a ratchet-engaging portion 27. The keys are normally held in their rest positions by means of springs 28 which grip lugs on the arms 20a and lugs 29 extending from the underside of the cover 23. When it is desired to initiate a call, only one key is depressed at any one time, it being necessary to await the completion of the dialing cycle before depressing another key 20. When the key is depressed to initiate a call, it slides downwardly as viewed in Fig. 2 in a direction extending lengthwise of the bars 24.

Associated with each row of keys is a bar 30 suspended at its ends by links 31 and 32, one end of each link 31 and 32 being slidably supported within apertures in the end plate 33 of the housing and the opposite end of each link 31 and 32 being pivotally attached to arms 35 and 36, which in turn are non-rotatably secured to a shaft 37 which is rotatably mounted on the side plates 38 and 39 of the housing. The arms 35 and 36, and hence the links 31 and 32, are urged to the right as viewed in Figs. 2–4 by means of springs such as the spring 40 which at one end grips a pin 41 extending through the arm 35 and into the shaft 37 and which at the other end engages a bracket or lug 42 mounted on the end plate 43 of the housing.

Each bar 30 has a series of ratchet teeth 44, the number of series corresponding to the number of keys 20 in a row. Each bar 30 is also provided with a plurality of projections 45 corresponding in number to the number of keys 20 in a row. When a key 20 is depressed, the heel portion 26 thereof slides over the corresponding teeth 44 and, at the end of the depression stroke, heel portion 26 strikes the projection 45 causing the bar 30 and hence the links 31 and 32 to move to the left as viewed in Figs. 2–4. When the key 20 which has been depressed is released by the operator, the key is urged towards its home position by its associated spring 38 and the heel portion 26 engages the first of the teeth 44, the links 31 and 32 and hence the bar 30, in the meantime being returned to the position shown in Fig. 2 by means of the springs 40, and causes the bar 30 to move upwardly as viewed in Fig. 2, it being noted that there is a small space between the shoulder 46 on the bar 30 and the link 31.

Figure 3:
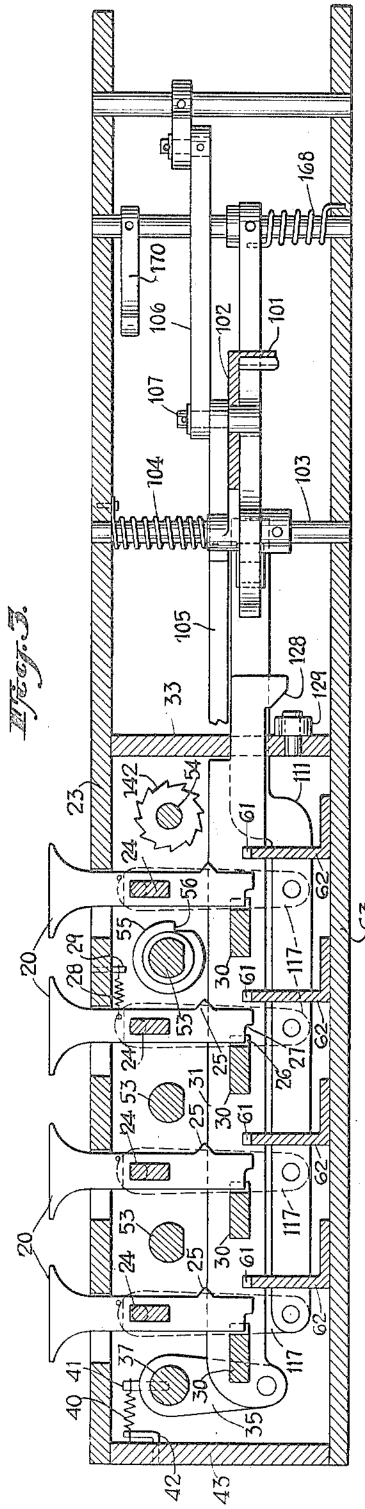
Fig. 3 is a cross-sectional view of the device shown in Figs. 1 and 2 and is taken along the line 3—3 indicated in Fig. 2.

As will be described hereinafter, movement of the link 31 causes the movement of several parts of the device, which in turn causes the motor 47 to rotate the gears 48—52. The gears 52 drive control shafts 53 associated with each row of keys, the control shaft 54 being driven by the gear 49, and on each shaft 53 and 54 a plurality of groups of control disks 55 are mounted, each group being mounted adjacent a series of teeth 44 on bar 30. As best shown in Fig. 3, each disk 55 has a notch 56 therein and, as viewed in Fig. 3, the disk 55 is rotated in a clockwise direction by the shafts 53 or 54. The disks 55 are spaced apart by drive disks 57 of smaller diameter than the disks 55. Although the shafts 53 and 54 are non-circular, the apertures in the disks 55 are such that the disks 55 may be rotated with respect to the shafts 53 and 54 on which they are mounted. However, the disks 57 have non-circular apertures therein corresponding to the non-circular shape of the shafts 53 and 54 and hence are rotated by the shafts 53 and 54. Collars 58 pinned to the shafts 53 and 54 are provided between the groups of disks 55 and 57 and the disks 55 are pressed against the disks 57 by springs 59 acting between the collars 58 and collars 60 which are slidable on the shafts 53 and 54 and which bear against the end disk 57 of each group. Thus, unless the disks 55 are restrained by a sufficient force, the friction between the disks 55 and the disks 57 causes the disks 55 to rotate with the shafts 53 and 54.

The bars 24 are rotatably supported at their ends on the side plates 38 and 39 and, when the bars 24 are rotated by means hereinafter described, the keys 20 are tilted so that the toe 25 of a depressed key rests on the periphery of a disk 55 and in this position the projecting portion 27 of the depressed key 20 engages the first tooth in the series of teeth 61 on the brackets 62 (Figs. 2 and 3) mounted on the bottom plate 63 of the housing. Thus, as the bars 24 are rotated, the keys 20 tilt disengaging the heel portion 26 of a depressed key 20 from the teeth 44 on a bar 30 and permitting the bar 30 having the teeth 44 from which the heel 26 has become disengaged to move downwardly as viewed in Fig. 2. Such downward movement of a bar 30 upon release may be caused by the action of gravity or the bars 30 may be provided with springs to produce such downward movement.

Figure 4:
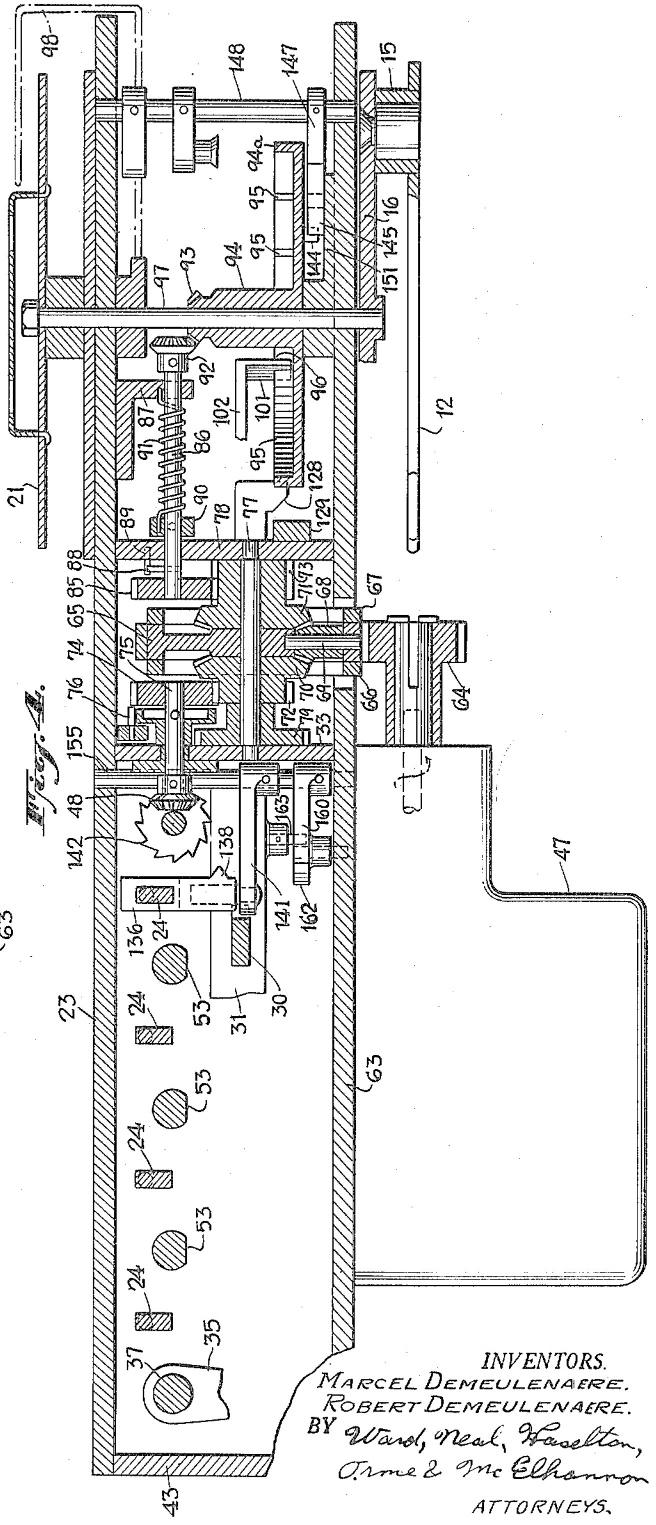
Fig. 4 is a cross-sectional view of the dialing device shown in the preceding figures and is taken along the line 4—4 indicated in Fig. 2.

The bars 24 rotate in the counter-clockwise direction as viewed in Figs. 3 and 4 to cause the heel portion 26 to become disengaged from a tooth of the series of teeth 44. When as described hereinafter the bars 24 are subsequently rotated clockwise as viewed in Figs. 3 and 4, the heel portion 26 engages the next tooth of the series 44 and the projecting portion 27 becomes disengaged from a tooth of the series 61. When this occurs, the bar 30 is again moved upwardly by virtue of the force applied to the depressed key 20 by spring 28 so that, when the bar 24 is again rotated in a counter-clockwise direction, the projecting portion 27 engages the next tooth of the series of teeth 61. Accordingly, as the bar 24 is alternately rotated counter-clockwise and clockwise tilting a depressed key 20, the depressed key 20 moves in step-by-step fashion toward its home or rest position.

*Gear trains*

The motor 47 drives the gear 64, the teeth of which engage the peripheral teeth of the differential drive gear 65 forming part of a differential gear system. On its side surfaces the gear 65 has a pair of cam portions 66 and 67 which are used to control the operation of certain parts in the manner hereinafter described. The gear 65 carries a planetary gear 68 which is rotatably mounted on a shaft 69 and the planetary gear 68 engages a pair of side gears 70 and 71 which have the gear teeth 72 and 73 in addition to the teeth which engage the planetary gear 68. Teeth 72 engage the teeth of a gear 74 which is non-rotatably mounted on a shaft 75, the shaft 75 being rotatably supported by a bearing in the end plate 33 and carrying at one end the gear 48 which is secured to the shaft 75 so as to be rotated thereby. The shaft 75 also carries a cam 76 which is rotatably mounted on the shaft 75. However, referring to Figs. 4 and 5, a pin 99 extends from the shaft 75 and is engageable with a pin 100 extending from the cam 76 so that when the shaft 75 turns counter-clockwise as viewed in Fig. 5, cam 76 turns with the shaft 75.

Figures 2, 8:
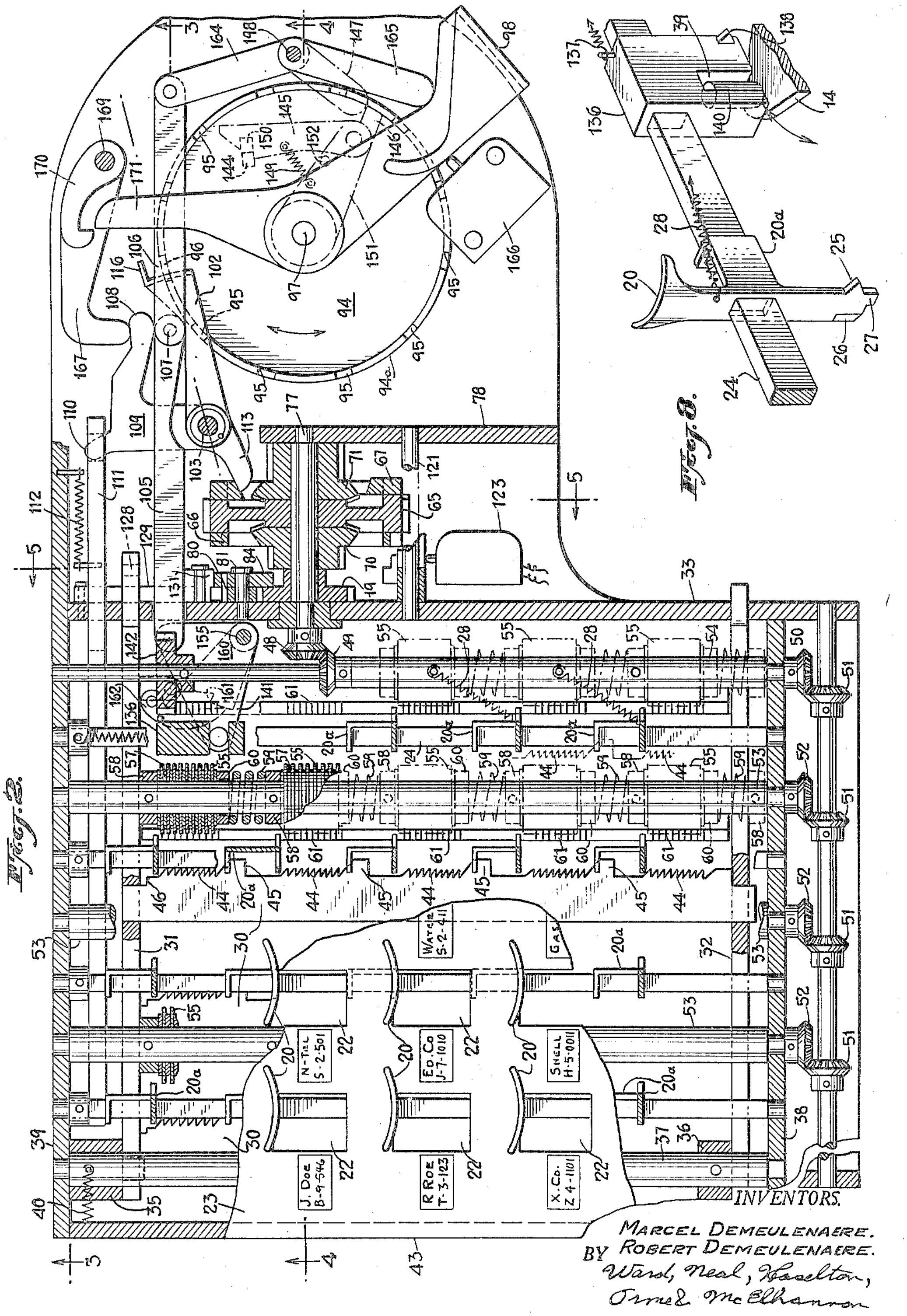
Fig. 2 is an enlarged plan view, partly in cross section, of the dialing device shown in Fig. 1.
Fig. 8 is a perspective view of a call-initiating key and a portion of the call number setting mechanism forming part of the dialing device of the invention.

Referring to Figs. 2 and 4, the side gears 71 and 72 are rotatably mounted on a shaft 77 which is rotatably supported at its ends by the end plate 33 and the bearing plate 78. The shaft 77 also carries the gear 65 and the gear 79, these latter two gears being fixed to the shaft 77 so as to rotate therewith.

Referring to Fig. 5, the gear 79 engages a gear 80 mounted on the shaft 81. The gear 80 has a pin 82 mounted thereon and the pin 82 extends through an arcuate slot 83 in a cam 84. Thus, the gear 80 is driven by the gear 79 and by means of the pin 82 the cam 84 is driven by the gear 80 although the cam 84 is permitted a limited amount of rotation with respect to gear 80, the cam 84 being rotatably mounted on the shaft 81.

The teeth 73 engage the teeth of a gear 85 which is secured to a shaft 86 so as to cause the shaft 86 to rotate with the gear 85 and the shaft 86 is rotatably supported by the bearing plate 78 and the bearing bracket 87. The rotation of the shaft 86 is limited by a pin 88 extending therefrom, which pin is engageable with the pin 89 extending from the bearing plate 78. A collar 90 is secured to the shaft 86 so as to be rotated by the shaft 86 and a torsion spring 91 encircles the shaft 86. One end of the spring 91 is secured to the collar 90 and the other end of the spring 91 is secured to the bearing bracket 87 so that the spring 91 urges the pin 88 against the pin 89 and returns the shaft 86 to the position shown in Fig. 4 after it has been rotated by the gear 85 and the gear 85 is released.

A gear 92 is also secured to the shaft 86 so as to be rotated therewith and gear 92 engages gear 93 forming part of a cup device 94 having an annular portion **94*a* which is provided with a plurality of similar slots 95 and a special slot 96 of greater width than the slots 95. The gear 93 and the cup device are rotatably mounted on the shaft 97 and the arm 16 carrying the finger 15 is non-rotatably mounted on the shaft 97. Also, the dial 21 is secured to the shaft 97 so as to cause the shaft 97 to rotate when the dial 21 is rotated manually. A finger stop 98 is also mounted on the shaft 97 but the shaft 97 is free to rotate with respect to the finger stop 98**.

It will be apparent from the above that, when gear 64 and hence gear 65 are driven by the motor 47, one of the side gears 70 and 71 will be driven by the planetary gear 68 when the other side gear is held stationary. In addition, if the motor 47 is stopped and the gear 65 is held stationary, rotation of one of the side gears 70 and 71 will rotate the planetary gear 68 and cause the other side gear to rotate. It is important to note this operation of the differential gear system because this effect is employed in controlling the movement of the finger 15, in setting the disks 55 to the positions required for automatic dialing of a party or number and to restore the various parts to their normal or rest positions. Also, reference will be made hereinafter to the "dial gear train" and to the "key gear train," the former expression being intended to define the gear train which is driven by the gear 71 and the latter expression being intended to define the gear train driven by the gear 70.

*Dial gear train control*

Referring to Figs. 2–4, the gear 71 may be stopped by arresting rotation of the gear 93 and gear 93 may be arrested by finger 101 on a dial gear train stopping member including an arm 102 which is rotatably mounted on a shaft 103 which is rotatably supported at its ends in top cover 23 and bottom plate 63. The arm 102 is urged in a counterclockwise direction as viewed in Fig. 2 by a torsion spring 104 secured at one end to the arm 102 and secured at the opposite end to the top cover 23. Links 105 and 106 are pivotally connected by means of a pin 107 which extends downwardly between arm 102 and the arm 108 of control member 109. Arm 110 of member 109 extends into a slot in link 111 which is movable in the direction of its length and which is urged to the right as viewed in Fig. 2 by spring 112 secured at one end to link 111 and secured at its opposite end to side plate 39. Thus, pin 107 is gripped between the arm 108 which is urged in the clockwise direction as viewed in Fig. 2 by spring 112 and the arm 102 which is urged in the counterclockwise direction as viewed in Fig. 2 by spring 104.

Member 109 is also provided with an arm 113 which is within the inner periphery of cam portion 67 (Figs. 2, 4 and 6). The cam portion 67 has a pair of rises 114 and 115. When the arm 113 is on either of the rises 114 and 115, the arm 102 is held in the position shown in Fig. 2 so that the finger 101 is in the slot 96 in the annular portion **94*a*, assuming, of course, that the pin 107 is in the position shown in Fig. 2. When the gear 65 is rotated so that the arm 113 is no longer on one of the rises 114 and 115, the arm 102 is caused to turn clockwise, as viewed in Fig. 2, by a small amount but not enough to disengage finger 101 from the annular portion 97 of the cup device 94. It is to be noted that the finger 101 is provided with a tab 116 and the slot 96 is of such a width that tab 116 can pass therethrough. However, the remaining slots 95 in the annular portion 94*a* are of such dimensions that the tab 116 cannot pass therethrough. Accordingly, when the arm 102 has been moved clockwise an amount sufficient to release portion 94*a* and the annular portion 94*a* has commenced to rotate, the finger 101 cannot re-enter a slot in the annular portion 94*a* until the annular portion 94*a* has completed a full rotation even though the arm 102** may during this rotation be again urged in the counter-clockwise direction as viewed in Fig. 2.

*Tilting of keys*

Referring to Figs. 2 and 3, link 111 is pivotally connected to arms 117 which are non-rotatably mounted on bars 24. Thus, when arm 113 is on either of the rises 114 and 115, the link 111 is moved to the left as viewed in Figs. 2 and 3 causing the bars 24 to rotate in a clockwise direction and causing the heel portion 26 of the depressed key to engage one of the teeth 44. On the other hand, when the arm 113 leaves a rise 114 or 115, the link 111 moves to the right causing the bars 24 to rotate in a counter-clockwise direction and engaging the portion 27 of a depressed key with one of the teeth 61 and engaging the toe 25 of the depressed key with the periphery of a disk 55.

When the disk 55 with which the toe 25 of the depressed key is engaged rotates an amount sufficient to permit the toe 25 to drop into a notch 56 (Fig. 3), the depressed key tilts in a counter-clockwise direction as viewed in Fig. 3 by an additional amount and such additional tilting of the depressed key 20 causes rotation of its associated bar 24. Such rotation of the bar 24 causes further movement of the link 111 to the right as viewed in Figs. 2 and 3, which in turn causes further clockwise rotation of the member 109 and the arm 102. Such further rotation of the arm 102 in the clockwise direction withdraws the finger 101 from the slot 96 and releases the annular portion **94*a* permitting the gear 93 to rotate when it is driven by the gear 92**.

*Dial finger drive*

Referring to Figs. 2 and 4, when the annular portion **94*a* is released by finger 101 and the gear 93 is driven by gear 92, the cup device 94 is driven in a clockwise direction as viewed in Fig. 2. A pin or lug 144 projects from the underside of the cup device and is engageable with a pawl 145. In the rest position, that is, the position shown in Fig. 2, of the cup device 94 the pawl 145 is held in the position shown in Fig. 2 because of engagement of the tail portion 146 of the pawl 145 with the arm 147 which is mounted on and secured to a shaft 148 so that arm 147 will turn with the shaft 148 when the latter is rotated. Pawl 145 is urged toward the shaft 97 by a spring 149 so that after the cup device 94 is rotated and the tail portion 146 moves out of engagement with the arm 147, the pawl 145 moves counter-clockwise, as viewed in Fig. 2, about its axis and the lug 144 is received within the notch 150**.

The pawl 145 is pivotally mounted on an arm 151 which is non-rotatably secured to the shaft 97 and hence, when the lug 144 engages the pawl 145, the shaft 97 is rotated by the cup device and in turn the arm 16 and the finger 15 are turned causing rotation of the dial 12.

When the cup device returns to its rest position as shown in Fig. 2, the shaft 97 is turned in the counterclockwise direction because of the fact that the lug 144 is embraced by the pawl 145, the lug 144 being within the notch 150. However, as the cup device approaches its rest position, the tail portion 146 is engaged by the arm 147 and the pawl 145 is rotated clockwise about its pivot axis causing it to assume the position shown in Fig. 2.

*Differential drive gear control and motor energization*

Rotation of the differential drive gear 65 is stopped when a pawl 118 enters into one of the notches 119 and 120 in the cam portion 66. Pawl 118 is rotatably mounted on a shaft 121 and rests against the actuating arm 122 of the switch 123 which controls the energization of the motor 47. A lever 124 is also rotatably mounted on the shaft 121 and is provided with a pair of lugs or pins 125 and 126. The arm 127 of the lever 124 rides on the periphery of cam 84 and, when the dialing device is in its normal or rest position, the end of the arm 128 is on the rise of the cam 84 permitting the pawl 118 to enter into one of the notches 119 and 120 and opening the energizing circuit for the motor 47.

It will be recalled that when a key 20 is depressed, a bar 30 is caused to move to the left as viewed in Fig. 2, which in turn causes the link 31 to move to the left. Link 31 is provided with a projection 128 (Figs. 3 and 4) which when the link 31 moves to the left engages an arm 129 (Fig. 5) causing the arm 129 to move in a counterclockwise direction about its pivot 130. A pawl 131 is pivotally mounted on the end of arm 129 and, when the arm 129 is moved in the counterclockwise direction by the link 31, the pawl 131 enters into a notch 132 in the cam 84. When the depressed key is released by the operator the bars 30 move to the right as viewed in Fig. 2 and the link 31 also moves to the right, which causes the arm 129 to be moved upwardly as viewed in Fig. 5 by the spring 133 causing the cam 84 to rotate counterclockwise. The amount of rotation of the cam 84 is sufficient to permit the arm 127 to drop and hence to cause the pin 125 to move the pawl 118 out of the notch in the cam portion 66 and to close the switch 123 which energizes the motor 47. At the same time, pin 126 drops into the notch 134 in the cam 76. Cam 76 is prevented from rotating, unless it is driven by pin 99, by means of a spring arm 135 which is mounted on the end plate 33 and which rides on the periphery of cam 76.

*Key gear train control*

Referring to Figs. 2, 8 and 10, a key gear train stopping member 136 is slidably mounted on the bar 24 nearest the shaft 54. The member 136 is urged toward the side plate 39 by a spring 137 which is secured at one end to the member 136 and at the opposite end to the support for bar 24. The member 136 is provided with a projection 138 and has a slot 139 therein for receiving pin 140 mounted on movable positioning plate 141.

When the member 136 is set for automatic dialing, it is in the position shown in Fig. 2. It will be recalled that all of the bars 24 rotate together and, therefore, the member 136 tilts whenever the keys 20 tilt. Accordingly, when a key 20 is depressed and subsequently tilted so that the toe 25 of a depressed key is in contact with the periphery of a disk 55, the member 136 will also be in a tilted position. A ratchet wheel 142 (Figs. 2 and 3) is mounted on shaft 54 and is secured thereto so as to be rotatable therewith. When the member 136 is in the aforementioned tilted position, the projection 138 is immediately adjacent the wheel 142 but does not touch the teeth of the wheel 142. However, when the bar 24 is rotated because the toe 25 of a depressed key 20 enters the notch 56 in a disk 55, the projection 138 engages a tooth of the wheel 142 preventing further rotation of the wheel 142 and hence stopping the key gear train.

The projection 138 remains in engagement with a tooth of the wheel 142 until the bars 24 are rotated in a clockwise direction as viewed in Fig. 3 by means of link 111, which, it will be recalled, is controlled by member 109 and cam portion 67 on gear 65.

*General description of operation*

The movement of the finger 15 (Fig. 4), and hence of the dial 12, is controlled by the disks 55 (Figs. 2 and 3). As will be apparent from the foregoing description and from the description set forth hereinafter, if the other parts are properly related, the number of disks 55 may be the same as the number of digits and letters in a telephone number which it is desired to call. However, the number of disks 55 also may be greater than the number of letters and digits in a telephone number. In the present embodiment there are nine disks 55, so that telephone numbers having up to a combined total of nine letters and digits may be dialed using the device of the invention.

Assuming that the nine disks 55, adjacent a key 20 which it is desired to employ to place a call to a particular party, have been properly set, as hereinafter described, so that the notches 56 therein are positioned as required, the selected key 20 is depressed which closes the switch 123 (Figs. 2 and 5), the switch 123 closing the energizing circuit for the motor 47 (Fig. 4). At this time the dial gear train is restrained because of the engagement of the finger 101 with the annular portion 94*a* of the cup device 94 (Figs. 2 and 4). The motor 47 drives the gear 65 (Figs. 2 and 4) causing rotation of the key gear train. Rotation of the key gear train continues until the toe 25 of the selected key enters into the notch 56 (Fig. 3) of the first disk 55. Rotation of the key gear train is then stopped because projection 138 on member 136 engages a tooth on ratchet wheel 142 (Figs. 3 and 4). However, at the same time finger 101 moves out of engagement with the annular portion 94*a* releasing the dial gear train. The motor 47 then drives the dial gear train causing finger 15 to rotate dial 12.

When the dial 12 has been rotated by a predetermined amount, the pawl 118 (Fig. 5) enters into one of the notches 119 and 120 on the cam portion 66 (Fig. 5) stopping motor 47 and gear 65. At the same time, one of the rises 114 and 115 (Fig. 6) moves member 109 (Fig. 2) causing projection 138 to become disengaged from the ratchet wheel 142. Thus, both the key gear train and the dial gear train are free to rotate, it being noted that finger 101 cannot enter into any of the slots 95 (Figs. 2 and 4) because of the tab 116 (Fig. 2). Under the action of the spring 91 (Fig. 4), cup device 94 is returned to its rest position, which movement of cup device 94 returns dial 12 to its rest position. However, the spring 91 at the same time rotates the dial gear train in the reverse direction, that is, in a direction opposite to that in which it was rotated when driven by the motor 47 and such rotation of the dial gear train, by virtue of the planaetary gear 68 (Fig. 4), causes rotation of the key gear train in the same direction that it was rotated by the motor 47.

It will thus be apparent that the shafts 53 and 54 (Figs. 2 and 3) are first rotated through part of a turn, the cup device 94 is then rotated through part of a turn, and the cup device 94 then returns to its rest position further rotating shafts 53 and 54 in the same direction in which they were originally rotated. The gearing is such that the first fraction of the turn through which shafts 53 and 54 are rotated is complementary to the fraction of a turn through which the cup device 94 is rotated and during the return of the cup device 94 to its rest position it rotates the shafts 53 and 54 the balance of the amount necessary to cause shafts 53 and 54 to rotate one full turn.

The cams shown in Fig. 5 and their drives are such that when the cup device 94 returns to its rest position, a new cycle of operations is initiated and the toe 25 of the selected key rides on the periphery of the second disk 55 of the group of disks 55. The cycle of operations set forth above is then repeated until all nine disks 55 have been traversed by the toe 25 of the selected key. After this has been accomplished, the cams shown in Fig. 5 prevent further cycles of operation. Also, the selected key 20 has returned to its rest position and the dialing device is ready for use in connection with the dialing of a further telephone number.

*Number dialing operation*

The expression "telephone number" is used in its general sense as meaning a combination of letters and digits representing the operation of a telephone instrument dial required to establish a wire connection with a desired party. Of course, the number may consist entirely of digits or entirely of letters, but the exact nature of the number is unimportant since the control mechanism of the dialing device is set up so as to perform the necessary dialing operations whenever a key is depressed.

An operator desiring to place a call to a particular party lifts the telephone handset from the instrument base and after hearing the signal which indicates that the exchange equipment is ready to respond to dialing, such a signal being "dial tone" for example, the operator presses the key 20 which is marked with the name or telephone number of the party it is desired to call. The dialing device 10 then proceeds to operate as set forth in the following paragraphs, it being assumed that the control mechanism associated with the depressed key 20 has previously been set to accomplish the desired dialing operations.

Referring to Fig. 2, heel portion 26 of the depressed key strikes projection 45 which displaces the corresponding bar 30 to the left, the displaced bar 30 moving the link 31 to the left engaging the projection 128 (Fig. 3) with the arm 129 (Fig. 5) and moving arm 129 downwardly. Pawl 131 on arm 129 enters in notch 132 in cam 84. When the depressed key is released by the operator, the bar 30 moves to the right moving the link 31 to the right and disengaging projection 128 from arm 129. This releases arm 129 and permits the pawl 131 to rotate the cam 84 counter-clockwise. Arm 127 is permitted to drop, pin 125 moves pawl 118 out of notch 119 and pawl 118 closes switch 123 energizing the motor 47. Pin 126 is now in notch 134.

When the depressed key 20 was released, the heel portion 26 engaged the first of the teeth 44 (Fig. 2) moving corresponding bar 30 upwardly so that projecting portion 27 is in a position such that when the bar 24 is subsequently rotated, the projecting portion 27 engages the first of the teeth 61.

The motor 47 (Fig. 4) turns the gear 65 rotating the cam portion 67 and permitting member 109 (Fig. 2) to rotate clockwise and causing link 111 to move to the right. Such movement of link 111 rotates bars 24 and tilts the depressed key 20 in the counter-clockwise direction until the toe 25 thereof strikes the periphery of the first disk 55. At the same time, projecting portion 27 engages the first of the teeth 61 and the heel portion 26 is released from the first of the teeth 44 permitting the bar 30 to move downwardly into such a position that when the depressed key 20 is subsequently tilted in the clockwise direction, the heel portion 26 will engage the second of the teeth 44.

Pin 107 being moved by member 109, moves arm 102 inwardly of the cup device 94 but does not move it a distance sufficient to take finger 101 completely out of slot 96, the finger 101 still restraining the cup device 94 and thereby preventing rotation of gears 92 and 93 (Fig. 4) and, hence, the dial gear train.

The motor 47 rotates the gear 65, but since the dial gear train including side gear 71 cannot rotate, the planetary gear 68 causes rotation of only the key gear train including the side gear 70 and gears 48–52. The key gear train causes rotation of the shafts 53 and 54 (Figs. 2 and 3) and, hence, causes rotation of disk 55 which is in engagement with the toe 25 of the depressed key 20.

When the first disk 55 rotates an amount sufficient for the notch 56 therein (Fig. 3) to receive the toe 25, the depressed key 20 rotates or tilts counter-clockwise rotating the associated bar 24 counter-clockwise and moving link 111 (Fig. 2) to the right. This movement of link 111 rotates member 109 clockwise and through pin 107 completely disengages finger 101 from the annular portion 94*a* of the cup device 94. This releases cup device 94 and the dial gear train is free to rotate.

At the same time that toe 25 of the depressed key 20 is received by notch 56, member 136 is tilted by bar 24 and amount sufficient to cause the projection 138 to engage a tooth of the ratchet wheel 142. This prevents further rotation of shaft 54 and, hence, prevents further rotation of key gear train.

Since the dial gear train is free to rotate, the motor 47 drives the dial gear train through differential gear 65 and planetary gear 68 causing rotation of the cup device 94 (Fig. 2 and 4) in a clockwise direction, as viewed in Fig. 2. Lug 144 on the underside of cup device 94 pushes pawl 145, moving arm 151 and causing rotation of shaft 97. Rotation of shaft 97 moves finger 15 and, hence, rotates dial 12.

For purposes of illustration, it will be assumed that shafts 53 and 54 (Figs. 2 and 3) were rotated 3/12 of a turn before the toe 25 was received in the notch 56. It will also be assumed that the gear drives are such that after the key gear train has been stopped, the cup device 94 is rotated 9/12 of a turn. Since the differential gear 65 is rotated in the same direction at all times, the gear 65 must be stopped after the cup device 94 has been rotated 9/12 of a turn if further rotation of the cup device 94 is to be stopped after it has made 9/12 of a turn. Differential gear 65 is stopped by pawl 118 (Fig. 5) which drops into notch 120 (Fig. 7) on cam portion 66 (it being assumed that when the cycle of operation was commenced, pawl 118 was in notch 119). Accordingly, differential gear 65 makes a total of one-half turn while the shafts 53 and 54 rotate 3/12 of a turn and while the cup device 94 is rotating 9/12 of a turn. Attention is directed to the fact that there are ten finger holes on the dials of conventional telephone instruments used in the United States which are spaced apart by 1/12 of a turn, the first hole being spaced from the finger stop by 2/12 of a turn, so that rotation of the cup device 94 by 9/12 of a turn would cause dialing by such a dial corresponding to the digit 8 or the letters T, U or V.

During the rotation of the cup device 94, tail portion 146 (Fig. 2) becomes disengaged from arm 147, permitting pawl 145 to rotate counter-clockwise so that lug 144 is embraced within notch 150.

It will be recalled that the pawl 118 is held out of the notches 119 and 120 on the cam portion 66 by the pin 125 on the lever 124. During movement of the key gear train, gear 74 (Fig. 4) and hence shaft 75 are driven by side gear 70. Since pin 99 (Fig. 5) is in engagement with pin 100 and since the shaft 75 is rotated counter-clockwise as viewed in Fig. 5, cam 76 is rotated counterclockwise lifting pin 126 and hence lever 124. Lifting of lever 124 moves pin 125 to the right as viewed in Fig. 5 and permits pawl 118 to drop into notch 120 of cam portion 66 stopping rotation of the drive gear 65.

At the same time that the pawl 118 drops into the notch 120, cam rise 115 (Fig. 6) rotates member 109 (Fig. 2) counter-clockwise moving link 111 to the left and tilting the key 20 in the clockwise direction as viewed in Fig. 3. This lifts the toe 25 of the depressed key 20 out of the notch 56 of the first disk 55 and disengages the projection 138 (Figs. 3 and 4) of member 136 from the ratchet wheel 142. Although there are eleven slots 95 and one slot 96 in the annular portion 94*a*, only slot 96 is wide enough to receive the tab 116 so that cup device 94 and hence the dial gear train are still free to move even though the key gear train is also released when projection 138 becomes disengaged from ratchet wheel 142. Thus, at this point in the operation, the differential drive gear 65 is held stationary by the pawl 118 and both the key gear train and the dial gear train are free to move.

Since the telephone instrument dial 12 has a spring return, the dial 12 as well as the spring 91 cause the dial 21, the shaft 97 and the cup device 94 (Figs. 2 and 4) to rotate counter-clockwise. It will be noted that since the lug 144 is engaged by the pawl 145, the arm 151 and the cup device 94 rotate together and with the shaft 97.

Since the differential drive gear 65 is held stationary, the return movement of the dial 21 and the cup device 94 which causes rotation of the side gear 71 also causes rotation of the side gear 72 and hence the key gear train. The gearing is such that the shafts 53 rotate an amount which is equal to the difference between one full turn and the amount which the shafts 53 were originally rotated by the motor 47. Thus, in the case under consideration, the shafts 53 are rotated 9/12 of a turn by the dial gear train, which means that since the beginning of the cycle of operations the shafts 53 have rotated one full turn.

The gearing is such that during the rotation of the shafts 53 through one full turn the cam 76 is also rotated through one full turn by the gears 70 and 74. Thus, at the end of one turn of the shafts 53, the cam 76 is again in the position shown in Fig. 5. However, gear 80 (Figs. 2 and 5) mounted on shaft 81 has nine teeth, whereas gear 79 mounted on shaft 77 has twenty teeth. Gear 79 is rotated one-half turn or an amount equal to ten teeth while the cam 76 is rotated one full turn. Thus, gear 79 will rotate gear 80 by an amount equal to ten of the teeth on gear 80 so that the gear 80 will rotate one full turn plus an amount equal to the distance between a pair of adjacent teeth. Accordingly, at the end of one full turn of the cam 76 the gear 80 moves slightly beyond the position thereof shown in Fig. 5 causing cam 84 to move slightly beyond its position shown in Fig. 5. Consequently, when the cam 76 completes one full turn, the cam 84 will be in a position such that the arm 127 drops down permitting lever 124 to drop down and causing the pawl 118 to move out of notch 120 and closing switch 123. This initiates a new cycle of operations similar to those set forth above, except that the toe 25 of the depressed key 20 will engage the surface of the second disk 55.

It will be seen from the above that the cycles of operation will repeat, the toe 25 and depressed key 20 successively engaging different ones of the disks 55 until nine complete cycles of operation have occurred. Thus, after nine cycles of operation, cam 84 will be in the position shown in Fig. 5 so that, at the end of the ninth cycle, arm 127 cannot drop down. When arm 127 cannot drop down at the end of a cycle, the operation of the dialing device 10 stops and can be re-initiated only by depressing a key 20.

Attention is directed to the fact that at the end of each cycle the cup device 94 assumes the position shown in Figs. 2 and 4, and, therefore, the finger 101 can enter into the slot 96.

It will be apparent from the above that the movement of the dial 12 is controlled by the setting of the disks 55. Thus, by properly disposing the notches 56 in the disks 55 the dial 12 can be caused to rotate up to nine times in succession, the amount of rotation being determined by the peripheral position of the notch 56. The method of setting the disks 55 will be described in detail hereinafter.

*Manual Dialing*

When it is desired to call a number of a party which is not listed beside one of the keys 20, the number may be dialed by manual operation of the dial 21 forming part of the dialing device 10. When the keys 20 are in their rest positions, rotation of the dial 21 causes rotation of the shaft 97 and hence of the arm 16. During such rotation of the shaft 97 by the dial 21, the pawl 145 is prevented from engaging the lug 144 by the arm 147 which engages the tail portion 146 of the pawl 145. As the shaft 97 is rotated, the tail portion 146 becomes disengaged from the arm 147 but, since the cup device 94 has not rotated, the lug 144 does not become embraced within the notch 150. Counter-clockwise rotation of the pawl 145 is limited by a pin 152 on the arm 151. When the dial 21 and hence the arm 151 return to their rest positions, the pawl 145 is pushed into the position shown in Fig. 2 so that the pawl 145 is ready to hook the lug 144 if and when the dial device 94 is rotated or if the arm 147 releases the tail portion 146 as hereinafter described.

*Setting of control mechanism*

As mentioned above, a feature of the present invention is the ease with which the control mechanism of the dialing device may be set or changed and, in fact, it is almost as simple to set up or change the control mechanism as it is to dial a number manually.

Referring to Figs. 2, 4, 8 and 10–12, the dialing device 10 is provided with a manually operable knob 153 (Figs. 11 and 12) which is mounted on a resilient arm 154, the arm 154 being rotatably mounted on a shaft 155. The knob 153 is provided with a projection 156 which extends below the arm 154 and which fits into either one of a pair of recesses in the top cover 23, one of the recesses being indicated at 157 in Fig. 11. When the knob 153 is in the position shown in Fig. 11, the dialing device 10 is ready for automatic operation. However, when it is desired to set the control mechanism, the knob 153 is lifted and moved so that the projection 156 is received in the recess 157.

An arm 158 is non-rotatably mounted on a shaft 155 and carries a pin 159 at the end thereof which is engageable by the arm 154 as the knob 153 is moved toward the recess 157. This causes the arm 158 to rotate the shaft 155 in a counter-clockwise direction. However, when the knob 153 is subsequently returned to the position shown in Fig. 11, it does not return the arm 158 at the same time.

Referring to Figs. 2, 4 and 8, the movable positioning plate 141 is non-rotatably mounted on the shaft 155 so as to be moved therewith. When the arm 158 is in the position shown in Fig. 11, the member 136 is in the position shown in Fig. 2 so that the projection 138 on the member 136 is engageable with the teeth of the ratchet wheel 142. However, when the arm 158 is moved by the arm 154, the member 136 slides along the bar 24 because of the engagement of pin 140 on the plate 141 with the member 136 so that the projection 138 can no longer engage the teeth of the ratchet wheel 142. Accordingly, tilting of the keys 20 as previously described does not engage the projection 138 with the ratchet wheel 142 and hence does not stop the key gear train.

An arm 160 is also non-rotatably mounted on the shaft 155 and has a notch 161 therein for receiving the end of a pawl 162 which is urged by a spring (not shown) toward the arm 160. Thus, as the shaft 155 is rotated in the counter-clockwise direction as viewed in Figs. 2 and 11, the arm 160 is moved and the end of the pawl 162 is received in the notch 161 preventing return of the member 136 to the position shown in Fig. 2 and preventing return of the arm 158 to the position shown in Fig. 11 even though the knob 153 may be returned to the position shown in Fig. 11. However, it should be noted that when projection 156 of knob 153 is in recess 157, the pawl 162 does not rest in notch 161. Instead, the pawl 162 rests on the portion of the end of the arm 160 on the opposite side of notch 161 from the portion on which the pawl 162 is shown resting in Fig. 2.

A pin 163 is mounted on the underside of the link 31 and this pin is engageable with the pawl 162 so that when the link 31 is moved to the left as viewed in Fig. 4 in a manner hereinafter described, the pin withdraws the end of pawl 162 from the notch 161 permitting the member 136 to return to the position shown in Fig. 2 and permitting the arm 158 to return to the position shown in Fig. 11, the member 136 being returned to the position shown in Fig. 2 by the spring 137 (Fig. 8) and at the same time rotating the shaft 155 in the clockwise direction as viewed in Fig. 11.

The positioning plate 141 is also pivotally connected to the end of link 105 (Figs. 2 and 3) so that, when the shaft 155 is rotated in the counter-clockwise direction, the link 105 moves to the left as viewed in Fig. 2 and 3. This movement of link 105 causes the pin 107 to move to the left and upwardly within the recess in member 109 as viewed in Fig. 2 and thereby permits the arm 102 to move in a counter-clockwise direction around the shaft 103, the arm 102 being urged in the counter-clockwise direction by spring 104. Such movement of arm 102 removes finger 101 from slot 96 releasing cup device 94 and hence releasing the dial gear train. It is to be noted that contrary to the situation when the device is being used for automatic dialing, the finger 101 moves to the outside of the annular portion 94*a* so that the finger 101 is not prevented by tab 116 from entering into the notches 95.

In moving to the left, link 105 also moved link 106 to the left as viewed in Figs. 2 and 3. The end of link 106 is pivotally connected to an arm 164 which is non-rotatably mounted on the shaft 148. Accordingly, when link 106 moved to the left, the shaft 148 also rotated in the counter-clockwise direction as viewed in Fig. 2, disengaging arm 147 from the tail portion 146 and moving arm 165, which is non-rotatably mounted on shaft 148, in a counter-clockwise direction around the shaft 148. A switch 166 is connected in series with the switch 123 and is normally held closed by the finger stop 98 so that, when the switch 123 is closed as previously described, the motor 27 is energized. However, when the arm 165 is moved by the shaft 148, the finger stop 98 moves in a counter-clockwise direction around the shaft 97 an amount sufficient to open the switch 166 and thus prevent energization of the motor 47 even though the switch 123 is subsequently closed.

When the arm 147 released the tail portion 146, the pawl 145 moved counter-clockwise about its pivot causing the lug 144 to become embraced within the notch 150.

Thus, by moving the knob 153 from the "on" position to the "off" position shown in Fig. 11, the following is accomplished.

(1) The projection 138 is moved to such a position that it cannot engage the teeth of ratchet wheel 142 and, therefore, the key gear train cannot be stopped by the member 136.

(2) The finger 101 is moved out of the slot 96 releasing the cup device 94 so that the dial gear train is free to move.

(3) Lug 144 is hooked by the pawl 145 so that the cup device 94 rotates with the shaft 97.

(4) The switch 166 is opened so that the motor 47 cannot be energized by closing the switch 123.

(5) The end of pawl 162 rests on the portion of the arm 160 which is on the opposite side of the notch 161.

After the operator moves the knob 153 as described above, he depresses the key 20 which it is desired to employ subsequently for the automatic dialing of a particular number or party. Depression of a key 20 causes the same movement of the parts described above in connection with automatic dialing except that the motor 47 is not energized because switch 166 is open. Since finger 101 is out of slot 96, it is possible to turn the dial 21. Suppose that the first letter or digit of the party to be called corresponds to the digit 4. The operator inserts his finger in the hole of the dial 21 marked with the digit 4 (and the corresponding letter or letters) and rotates the dial in the clockwise direction. The operator's finger strikes the finger stop 98 after the dial 21 and the cup device 94 have been rotated 5/12 of a turn. This causes the finger stop 98 to move an amount sufficient to close the switch 166 and, since the switch 123 has previously been closed because of the depression of a key 20, the motor 47 will start.

Prior to striking the finger stop 98 and hence prior to energization of the motor 47, the cup device 94 was rotated through 5/12 of a turn. At the same time, the differential drive gear 65 was held stationary by the motor 47 so that the dial gear train which is driven by the cup device 94 causes the shafts 53 through the key gear train to move backwards by 5/12 of a turn.

As soon as the motor 47 starts, the differential drive gear 65 is rotated causing the member 109 (Fig. 2) to rotate in the clockwise direction. Arm 108 of member 109 then moves arm 102 clockwise causing the finger 101 to enter into the slot 95, which is 5/12 of a turn removed from slot 96, locking the dial gear train.

At the same time, arm 167 (Fig. 2) which is urged in a counter-clockwise direction as viewed in Fig. 2 by spring 168 (Fig. 3) moves counter-clockwise rotating shaft 169 and causing hook 170 to move in a counter-clockwise direction. Hook 170 engages the arm 171 of the finger stop 98 and holds the finger stop 98 in a position such that the switch 166 is closed.

Drive gear 65 will make ½ turn as heretofore described and, since the dial gear train is locked, the key gear train will cause the shafts 53 to make a full turn. During rotation of the shafts 53, the toe 25 of the depressed key 20 is in engagement with the periphery of the first of the disks 55. During some part of the rotation of the first disk 55 the notch 56 therein will arrive in front of the toe 25 and the toe 25 will drop therein. Since the projection 138 cannot engage the ratchet wheel 142, the shafts 53 will continue to turn but, although the friction between the disks 55 and 57 (Fig. 2) is sufficient to drive the disks 55 when the toe 25 is riding on the periphery of the disk 55, the friction is insufficient to continue rotation of the disk 55 after the toe 25 has dropped into the notch 56. Accordingly, after the toe 25 drops into the notch 56, the first disk 55 remains stationary while the shafts 53 turn and, at the end of a full turn of the shafts 53, the notch 56 of the first disk 55 will still be in front of the toe 25 of the depressed key.

At the end of ½ turn of the drive gear 65 the arm 113 (Fig. 2) will be engaged by the rise 144 (Fig. 6) of the cam portion 67 causing the member 109 to move in the counter-clockwise direction as viewed in Fig. 2. This permits finger 101 to release cup device 94 and disengages hook 170 from the arm 171. Dial 21 and the cup device 94 will return to their rest positions and finger stop 98 will rotate permitting switch 166 to open and thereby stop motor 47.

Rotation of the member 109 in the counter-clockwise direction also moves link 111 to the left as viewed in Fig. 2 rotating bars 24 clockwise as viewed in Fig. 3 and thereby disengaging the toe 25 of the depressed key 20 from the first disk 55.

While the cup device 94 is returning to its home position, the drive gear 65 is held stationary by a pawl 118 (Fig. 5) and, therefore, the dial gear train will cause the key gear train to rotate in the forward direction and hence will cause the shafts 53 to rotate 5/12 of a turn in the clockwise direction as viewed in Fig. 3, it being noted that the cup device 94 rotates 5/12 of a turn in returning to its rest position. Thus, when cup device 94 has returned to its rest position, the notch 56 of the first disk 55 will have moved to a position such that it is 7/12 of a turn in the forward direction from the toe 25 of the depressed key 20. It will be recalled from the description of the automatic dialing operation that this is the correct position of the notch 56 when it is desired to rotate the dial 12 through 5/12 of a turn during automatic dialing and to dial the digit 4 or its corresponding letter.

The depressed key 20 is now in such a position that when the keys 20 are again tilted by member 109 the toe 25 thereof will engage the periphery of the second disk 55. Accordingly, when the operator again operates the dial 21, the notch 56 and the second disk 55 will be set in the manner described above so as to cause dialing by the dial 12, during subsequent automatic operation, of the second digit or letter manually dialed by the operator using the dial 21. This process is repeated for each of the letters or digits in the number of the party it is desired to call by use of the selected key 20.

Since there are nine disks 55, the control mechanism can be set up so as to dial a telephone number having a combined total of nine letters and digits. If, however, the total of the letters and digits is less than nine, the operator returns the knob 153 to the "on" position at the end of the dialing with the dial 21 of the desired telephone number. Thus, if it is assumed that the telephone number includes a total of seven letters and digits, the knob 153 would be moved to the "on" position after the seven letters and digits have been dialed using the dial 21. This permits the positioning plate 141 and the arm 160 to rotate clockwise until the end of pawl 162 drops into notch 161. This movement of the positioning plate 141 is sufficient to cause the pin 107 to move finger 101 into slot 96 but is insufficient to move member 136 into a position such that the projection 138 is engageable with the ratchet wheel 142 when the keys 20 are tilted. This movement of the positioning plate 141 and hence the links 105 and 106 is also sufficient to cause arm 165 to press finger stop 98 against switch 166 and to thereby energize the motor 47.

During the setting of the disk 55 as described above, the key gear train is rotated in the backward direction during clockwise rotation of the dial 21 by the operator. However, such backward movement of the key gear train did not cause clockwise rotation of the cam 76 as viewed in Fig. 5 because the pin 99 is so disposed that it can drive the cam 76 only in the counter-clockwise direction as viewed in Fig. 5. During clockwise rotation of the shaft 75 carrying the pin 99 the cam 76 is held in a fixed position by the spring arm 135.

When the motor 47 is restarted by movement of the knob 153 to the "on" position, the motor 47 drives only the key gear train because the dial gear train is locked by the finger 101. At the end of each full turn of the shafts 53, the cam 76 will be in a position such that the lever 124 drops down moving pawl 118 and closing switch 123. Thus, at the end of each full rotation of the shafts 53, the motor 47 is re-energized causing as many rotations of the shaft 53 as is required to cause the depressed key 20 to return to its rest position. In the assumed case, namely, that the knob 153 is moved to the "on" position after the dialing of a total of seven letters and digits, the shafts 53 would make two full revolutions after the knob 153 is moved to the "on" position. After the nine disks 55 have been traversed by the toe 25 of the depressed key, further energization of the motor 47 is stopped in the manner described in connection with automatic dialing.

During the above-mentioned last two revolutions of the shafts 53, the dial 21 and hence the dial gear train have not moved so that the last two disks 55 will have their notches 56 in front of the toe 25 of the depressed key 20 when the last two cycles of subsequent automatic operation are commenced. Accordingly, when the key 20 tilts during automatic operation, the notch 56 will have just passed the toe 25 when it reaches the periphery of the disk 55. Thus, the disk 55 will make a complete turn before the toe 25 can enter into the notch 56. When the disk 55 makes a complete turn during automatic operation (12/12 of a turn), the dial gear train does not move and, therefore, the last two disks 55 will not operate the finger 15 and the dial 12.

At the end of the setting of the disks 55 of the control mechanism, the positioning plate 141 and the arm 160 have not returned to their rest positions. However, when a key 20 is subsequently pressed for the purpose of automatically dialing a telephone number, the key 20 moves the link 31 to the left as viewed in Figs. 2 and 3 in the manner previously described in connection with the automatic dialing operation and, therefore, pin 163 (Fig. 4) moves pawl 162 out of notch 161 releasing arm 160 and permitting member 136, plate 141 and arm 160 to return to their rest positions.

Although prior to depression of a key 20 for the purpose of automatically dialing a telephone number, the links 105 and 106, and hence the arms 147 and 165, are in an intermediate position, such intermediate position of arm 147 will still disengage pawl 145 from lug 144 and, therefore, it is possible to dial manually a telephone number using the dial 21 even though the positioning plate and the associated links and arms have not been returned to their rest positions. The pawl 145 can hook lug 144 only when the positioning plate 141 and hence the associated links and arms are in the extreme positions thereof produced by moving the knob 153 into the "off" position.

It will be apparent from the above that it is a relatively simple manner to set up or change the control mechanism of the dialing device and that the required operations may be performed by an unskilled operator. Thus, the steps required to set up or change the control mechanism so as to cause the device to operate as required to automatically dial a predetermined telephone number upon depression of a particular key 20 are as follows:

(1) The operator moves the knob 153 from the "on" position to the "off" position.

(2) The particular key 20 which it is desired to employ to initiate the dialing operations is depressed.

(3) The dial 21 is manually operated in the manner which a telephone instrument dial is customarily operated to dial the predetermined number manually.

(4) After the manual operation of the dial 21 as set forth in (3) above, the knob 153 is moved from the "off" position to the "on" position.

After the motor 47 stops, the predetermined number can be dialed automatically by merely depressing the selected key 20, assuming, of course, that the telephone hand set is first removed from its cradle and the dialing signal, such as dial tone, has been received.

Having thus described our invention with particular reference to the preferred form thereof and having shown and described certain modifications, it will be obvious to those skilled in the art to which the invention pertains, after understanding our invention, that various changes and other modifications may be made therein without departing from the spirit and scope of our invention, as defined by the claims appended thereto.

What is claimed as new and desired to be secured by Letters Patent of the United States is:

1. An automatic dial operator comprising a manually rotatable first shaft; a first dial drivingly connected with said shaft; first means drivingly connected with said shaft and engageable with a telephone instrument dial for rotation of the latter; a differential gear system comprising a drive gear, a pair of side gears and a planetary gear mounted on said drive gear and interconnecting said side gears; a dial gear train drivingly connected with one of said side gears; second means for interconnecting said dial gear train with said first means; an electric motor drivingly connected with said drive gear; first cam means drivingly connected with said drive gear; a plurality of rotatable control shafts; a key gear train drivingly interconnecting the other of said side gears with said control shafts; second cam means driven by one of said gears; a plurality of additional cam means mounted on each of said control shafts, said additional cam means being positionally adjustable on said control shafts; a plurality of manually depressible keys mounted adjacent said additional cam means with one said key being mounted adjacent one said additional cam means, each of said keys having a portion engageable with said additional cam means; third means for successively positioning a depressed one of said keys adjacent different portions of said additional cam means; fourth means driven by said key gear train; a key gear train stopping member engageable with said fourth means for stopping said key gear tarin; a dial gear train stopping member having means thereon engageable with one of said first and second means for stopping said dial gear train; a control member operable by said first cam means and connected with said dial gear train stopping member for moving said last-mentioned stopping member into engagement with said one of said first and second means; fifth means interconnecting said control member with said keys for tilting said keys upon movement of said control member by said first cam means and for rotating said control member upon movement of said keys by said additional cam means whereby said dial gear train stopping member is moved out of engagement with said one of said first and second means; a switch electrically connected in series with said motor; sixth means operated by said second cam means for controlling the movement of said first cam means and for operating said switch; and seventh means interconnecting said keys and said second cam means for operating said second cam means upon depression of one of said keys and for thereby moving said sixth means and operating said switch.

2. An automatic dial operator comprising a manually rotatable first shaft; a first dial drivingly connected with said shaft; first means drivingly connected with said shaft and engageable with a telephone instrument dial for rotation of the latter; a differential gear system comprising a drive gear, a pair of side gears and a planetary gear mounted on said drive gear and interconnecting said side gears; a dial gear train drivingly connected with one of said side gears; second means for interconnecting said dial gear train with said first means; an electric motor drivingly connected with said drive gear; first cam means drivingly connected with said drive gear; a plurality of rotatable control shafts; a key gear train drivingly interconnecting the other of said side gears with said control shafts; second cam means driven by one of said gears; a plurality of spaced groups of disks mounted on each of said control shafts, each of said groups comprising a plurality of control disks rotatably mounted on said control shaft, said control disks each having a notch therein; friction drive means interconnecting said control shafts and said control disks; a plurality of rotatable key bars mounted adjacent said control shafts; a plurality of manually depressible keys mounted on each of said bars with one said key being mounted adjacent one said group of disks and said keys being mounted on said bars, each of said keys having a portion engageable, in a second predetermined position of rotation of its associated key bar different from the rest position thereof, with the periphery of a control disk; third means for successively positioning a depressed one of said keys adjacent different control disks in a group thereof; fourth means driven by said key gear train; a key gear train stopping member engageable with said fourth means for stopping said key gear train; a dial gear train stopping member having means thereon engageable with one of said first and second means for stopping said dial gear train; a control member operable by said first cam means and connected with said dial gear train stopping member for moving said last-mentioned stopping member into engagement with said one of said first and second means;

fifth means interconnecting said control member with said key bars for rotating said key bars into said rest position upon movement of said control member by said first cam means and into said second position upon further movement of said control member by said first cam means and for rotating said control member upon movement of said key bars to a third predetermined position whereby said dial gear train stopping member is moved out of engagement wtih said one of said first and second means; a switch electrically connected in series with said motor; sixth means for controlling the movement of said first cam means and for operating said switch; means operated by said second cam means for operating said sixth means; and seventh means interconnecting said keys and said second cam means for operating said second cam means upon depression of one of said keys and for thereby moving said sixth means and operating said switch.

3. An automatic dial operator comprising a manually rotatable first shaft; a first dial drivingly connected with said shaft; means drivingly connected with said shaft and engageable with a telephone instrument dial for rotation of the latter; first means rotatably mounted on said shaft; second means drivingly connecting said first means with said shaft, said second means being optionally operable to disconnect said first means and said shaft to permit said shaft to rotate independently of said first means; a differential gear system comprising a drive gear, a pair of side gears and a planetary gear mounted on said drive gear and interconnecting said side gears; a dial gear train drivingly interconnecting one of said side gears with said first means; an electric motor drivingly connected with said drive gear; first and second cams drivingly connected with said drive gear; a plurality of rotatable control shafts; a key gear train drivingly interconnecting the other of said side gears with said control shafts; cam means driven by one of said gears; a plurality of spaced groups of disks mounted on each of said control shafts, each of said groups comprising a plurality of control disks rotatably mounted on said control shaft, said control disks each having a notch therein; friction drive means interconnecting said control shafts and said control disks; a plurality of rotatable key bars mounted adjacent said control shafts; a plurality of manually depressible keys mounted on each of said bars with one said key being mounted adjacent one said group of disks and said keys being slidably and non-rotatably mounted on said bars, each of said keys having a toe engageable, in a second predetermined position of rotation of its associated key bar different from the rest position thereof, with the periphery of a control disk; ratchet means for successively positioning a depressed one of said keys adjacent different control disks in a group thereof; third means driven by said key gear train; a key gear train stopping member mounted on one of said key bars and having means thereon which in a third predetermined position of rotation of said key bars is engageable with said third means for stopping said key gear train, said key bars being moved into said third position by a depressed key when the notch in the control disk with which the toe of the depressed key is engageable is in a position to receive said last-mentioned toe; a dial gear train stopping member having means thereon engageable with said first means for stopping said dial gear train; a control member having an arm engageable with said second cam and having an arm connected with said last-mentioned stopping member for moving said means of said last-mentioned stopping member into engagement with said first means; a first link interconnecting said control member with said key bars for rotating said key bars into said rest position upon movement of said arm by said second cam and into said second position upon further movement of said arm by said second cam and for rotating said control member upon movement of said key bars to said third position whereby said means of said dial gear train stopping member is moved out of engagement with said first means; a switch electrically connected in series with said motor; fourth means for controlling the movement of said first cam and disks; a plurality of rotatable key bars mounted adjacent said control shafts; a plurality of manually depressible keys mounted on each of said bars with one said key being mounted adjacent one said groups of disks and said keys being slidably and non-rotatably mounted on said bars, each of said keys having a toe engageable, in a second predetermined position of rotation of its associated key bar different from the rest position thereof, with the periphery of a control disk; ratchet means for successively positioning a depressed one of said keys adjacent different control disks in a group thereof; a ratchet wheel driven by said key gear train; a key gear train stopping member mounted on one of said key bars and having a projection thereon which in a third predetermined position of rotation of said key bars is engageable with said ratchet wheel for stopping said key gear train, said key bars being moved into said third position by a depressed key when the notch in the control disk with which the toe of the depressed key is engageable is in a position to receive said last-mentioned toe; a dial gear train stopping member having a finger thereon insertable in said slots in said first means for stopping said dial gear train, said last-mentioned finger having a tab thereon which is narrower than said one slot but wider than the remaining said slots; a control member having an arm engageable with said second cam and having an arm connected with said last-mentioned stopping member for moving said last-mentioned finger into said slots and alternatively partly out of said slots; a first link interconnecting said control member with said key bars for rotating said key bars into said rest position upon movement of said arm by said second cam and into said second position upon further movement of said arm by said second cam and for rotating said control member upon movement of said key bars to said third position whereby said last-mentioned finger is moved out of said one slot; a switch electrically connected in series with said motor; third means for controlling the movement of said first cam and for operating said switch; means operated by said third and fourth cams for operating said third means; and fourth means interconnecting said keys and said fourth cam for moving said fourth cam upon depression of one of said keys and for thereby moving said third means and operating said switch.

4. An automatic dial operator comprising a manually rotatable first shaft; a first dial drivingly connected with said shaft; a first finger drivingly connected with said shaft and insertable in a finger hole of a telephone instrument dial for rotation of the latter; first means rotatably mounted on said shaft and having a plurality of slots therein, one of said slots being wider than the remainder thereof; a first arm connected to said shaft and rotatable therewith; second means drivingly connecting said first means with said arm, said second means being optionally operable to disconnect said first means and said arm to permit said arm to move independently of said first means; a differential gear system comprising a drive gear, a pair of side gears and a planetary gear mounted on said drive gear and interconnecting said side gears; a dial gear train drivingly interconnecting one of said side gears with said first means; an electric motor drivingly connected with said drive gear; first and second cams drivingly connected with said drive gear; a plurality of rotatable control shafts; a key gear train drivingly interconnecting the other of said side gears with said control shafts; a third cam driven by said last-mentioned side gear; a fourth cam driven by said drive gear; a plurality of spaced groups of disks mounted on each of said control shafts, each of said groups comprising a plurality of drive disks non-rotatably mounted on a control shaft and a plurality of control disks interleaved with said drive disks and rotatably mounted on said control shaft, said control disks each having a notch therein and being in frictional engagement with said drive said finger stop into and out of said predetermined position, for moving said last-mentioned finger into and out of said one slot and for moving said projection on said key gear train stopping member into and out of a position in which it is engageable with said ratchet wheel comprising a positioning plate, a manually movable knob connected to move said positioning plate, ratchet means for preventing return of said positioning plate to a predetermined position after movement out of said last-mentioned position by said knob, means interconnecting said plate with said finger stop and said key gear train and dial gear train stopping members, said plate in said predetermined position thereof holding said finger stop in said predetermined position thereof, said projection in position to engage said ratchet wheel and preventing movement of said last-mentioned finger from said one slot in a predetermined direction.

5. An automatic dial operator comprising a manually rotatable first shaft; a first dial drivingly connected with said shaft; a first finger drivingly connected with said shaft and insertable in a finger hole of a telephone instrument dial for rotation of the latter; first means rotatably mounted on said shaft and having a plurality of slots therein, one of said slots being wider than the remainder thereof; a first arm connected to said shaft and rotatable therewith; second means drivingly connecting said first means with said arm, said second means being optionally operable to disconnect said first means and said arm to permit said arm to move independently of said first means; a differential gear system comprising a drive gear, a pair of side gears and a planetary gear mounted on said drive gear and interconnecting said side gears; a dial gear train drivingly interconnecting one of said side gears with said first means; an electric motor drivingly connected with said drive gear; first and second cams drivingly connected with said drive gear; a plurality of rotatable control shafts; a key gear train drivingly interconnecting the other of said side gears with said control shafts; a third cam driven by said last-mentioned side gear; a fourth cam driven by said drive gear; a plurality of spaced groups of disks mounted on each of said control shafts, each of said groups comprising a plurality of drive disks non-rotatably mounted on a control shaft and a plurality of control disks interleaved with said drive disks and rotatably mounted on said control shaft, said control disks each having a notch therein and being in frictional engagement with said drive disks; a plurality of rotatable key bars mounted adjacent said control shafts; a plurality of manually depressible keys mounted on each of said bars with one said key being mounted adjacent one said groups of disks and said keys being slidably and non-rotatably mounted on said bars, each of said keys having a toe engageable, in a second predetermined position of rotation of its associated key bar different from the rest position thereof, with the periphery of a control disk; ratchet means for successively positioning a depressed one of said keys adjacent different control disks in a group thereof; a ratchet wheel driven by said key gear train; a key gear train stopping member mounted on one of said key bars and having a projection thereon which in a third predetermined position of rotation of said key bars is engageable with said ratchet wheel for stopping said key gear train, said key bars being moved into said third position by a depressed key when the notch in the control disk with which the toe of the depressed key is engageable is in a position to receive said last-mentioned toe; a dial gear train stopping member having a finger thereon insertable in said slots in said first means for stopping said dial gear train, said last-mentioned finger having a tab thereon which is narrower than said one slot but wider than the remaining said slots; a control member having an arm engageable with said second cam and having an arm connected with said last-mentioned stopping member for moving said last-mentioned finger into said slots and alternatively partly out of said slots; a first link interconnecting said control member with said key bars for rotating said key bars into said rest position upon movement of said arm by said second cam and into said second position upon further movement of said arm by said second cam and for rotating said control member upon movement of said key bars to said third position whereby said last-mentioned finger is moved out of said one slot; a pair of switches electrically connected in series with said motor; third means for controlling the movement of said first cam and for operating one of said switches; means operated by said third and fourth cams for operating said third means; fourth means interconnecting said keys and said fourth cam for moving said fourth cam upon depression of one of said keys and for thereby moving said third means and operating said one switch; a movable finger stop mounted adjacent said first dial and movable to a predetermined position upon movement of said first dial by an operator, said finger stop operating the other of said switches in said predetermined position thereof; and fifth means for moving said finger stop into and out of said predetermined position, for moving said last-mentioned finger into and out of said one slot and for moving said projection on said key gear train stopping member into and out of a position in which it is engageable with said ratchet wheel comprising a positioning plate, a manually movable knob connected to move said positioning plate, ratchet means for preventing return of said positioning plate to a predetermined position after movement out of said last-mentioned position by said knob, means interconnecting said plate with said finger stop and said key gear train and dial gear train stopping members, said plate in said predetermined position thereof holding said finger stop in said predetermined position thereof, said projection in position to engage said ratchet wheel and preventing movement of said last-mentioned finger from said one slot in a predetermined direction.

6. An automatic dial operator comprising a manually rotatable first shaft; a first dial drivingly connected with said shaft; a first finger drivingly connected with said shaft and insertable in a finger hole of a telephone instrument dial for rotation of the latter; a cup device rotatably mounted on said shaft and having a plurality of slots therein, one of said slots being wider than the remainder thereof; a first arm connected to said shaft and rotatable therewith; a lug extending from said cup device; a first pawl mounted on said arm and engageable with said lug, said pawl hooking said lug when driven thereby so as to move said arm in both of two opposite directions and said pawl also being manually movable into hooking engagement with said lug and alternatively being free from hooking engagement with said lug when said arm is moved by said shaft; a differential gear system comprising a drive gear, a pair of side gears and a planetary gear mounted on said drive gear and interconnecting said side gears; a dial gear train drivingly interconnecting one of said side gears with said cup device; an electric motor drivingly connected with said drive gear; a pair of cams drivingly connected with said drive gear, one of said cams having a pair of spaced notches and the other of said cams having a pair of spaced rises; a plurality of rotatable control shafts; a key gear train drivingly interconnecting the other of said side gears with said control shafts; a third cam having a notch therein and driven by said last-mentioned side gear; a fourth cam having a rise thereon and driven by said drive gear; a plurality of spaced groups of disks mounted on each of said control shafts, each of said groups comprising a plurality of drive disks non-rotatably mounted on a control shaft and a plurality of control disks interleaved with said drive disks and rotatably mounted on said control shaft, said control disks each having a notch therein and being in frictional engagement with said drive disks; means urging said control disks into frictional engagement with said drive disks; a plurality of rotatable key bars mounted adjacent said control shafts; a plurality of manually depressible keys mounted on each of said bars, one of said keys being mounted adjacent one of said groups of disks and said keys being slidably and non-rotatably mounted on said bars, each of said keys having a toe engageable, in a first predetermined position of rotation of its associated bar, with the periphery of a control disk; a plurality of slidable ratchet bars mounted adjacent said key bars, said ratchet bars having teeth thereon engageable with a depressed key in a second predetermined position of, rotation of said key bars; a plurality of ratchet brackets mounted adjacent said key bars, said brackets having teeth thereon engageable with a depressed key in said first predetermined position of said key bars; a ratchet wheel driven by said key gear train; a key gear train stopping member mounted on one of said key bars and having a projection thereon which in a third predetermined position of rotation of said key bars is engageable with said ratchet wheel for stopping said key gear train, said key bars being moved into said third position by a depressed key when the notch in the control disk with which the toe of the depressed key is engageable is in a position to receive said last-mentioned toe; a dial gear train stopping member having a finger thereon insertable in said slots in said cup device for stopping said dial gear train, said last-mentioned finger having a tab thereon which is narrower than said one slot but wider than the remaining said slots; a control member having an arm engageable with said other cam and having an arm connected with said last-mentioned stopping member for moving said last-mentioned finger into said slots and alternatively partly out of said slots; a first link interconnecting said control member with said key bars for rotating said key bars into said second position upon engagement of said arm with one of said rises of said other cam and into said first position upon disengagement of said arm from said rises and for rotating said last-mentioned member upon movement of said key bars to said third position whereby said last-mentioned finger is moved out of said one slot; a pair of switches electrically connected in series with said motor; a second pawl movable into said notches on said one cam, said pawl also being movable out of said notches and operating one of said switches when out of said last-mentioned notches; means operated by said third and fourth cams for moving said second pawl; means interconnecting said ratchet bars and said fourth cam for moving said fourth cam upon depression of one of said keys and for thereby moving said second pawl and operating said one switch; a movable finger stop mounted adjacent said first dial and movable to a predetermined position upon movement of said first dial by an operator, said finger stop operating the other of said switches in said predetermined position thereof; and means for moving for operating said switch; means operated by said cam means for operating said fourth means; and fifth means interconnecting said keys and said cam means for operating said cam means upon depression of one of said keys and for thereby moving said fourth means and operating said switch.

References Cited in the file of this patent

UNITED STATES PATENTS 2,060,371 Hilgers ---------------- Nov. 10, 1936